(12) United States Patent
Lin

(10) Patent No.: US 10,656,736 B2
(45) Date of Patent: May 19, 2020

(54) CURVED TOUCH MODULE STRUCTURE AND METHOD FOR LAMINATING THE SAME

(71) Applicants:INTERFACE TECHNOLOGY (CHENGDU) CO., LTD., Chengdu (CN); INTERFACE OPTOELECTRONICS (SHENZHEN) CO., LTD., Shenzhen (CN); GENERAL INTERFACE SOLUTION LIMITED, Miaoli County (TW)

(72) Inventor: Po Ching Lin, Guangdong (CN)

(73) Assignees: INTERFACE TECHNOLOGY (CHENGDU) CO., LTD., Chengdu, Sichuan (CN); INTERFACE OPTOELECTRONICS (SHENZHEN) CO., LTD., Shenzhen, Guangdong (CN); GENERAL INTERFACE SOLUTION LIMITED, Zhunan Township, Miaoli County (TW)

( * ) Notice: Subject to any disclaimer, the term of this patent is extended or adjusted under 35 U.S.C. 154(b) by 36 days.

(21) Appl. No.: 16/002,390

(22) Filed: Jun. 7, 2018

(65) Prior Publication Data

US 2019/0317618 A1 Oct. 17, 2019

(30) Foreign Application Priority Data

Apr. 13, 2018 (CN) .......................... 2018 1 0331837

(51) Int. Cl.
*G06F 3/041* (2006.01)
*B32B 7/12* (2006.01)
(Continued)

(52) U.S. Cl.
CPC ................ *G06F 3/041* (2013.01); *B32B 7/12* (2013.01); *B32B 37/06* (2013.01); *B32B 37/12* (2013.01);
(Continued)

(58) Field of Classification Search
CPC ...................................... B32B 37/06; B32B 7/12; B32B 37/12; B32B 2457/208; G06F 3/041; G06F 2203/04103
See application file for complete search history.

(56) References Cited

U.S. PATENT DOCUMENTS 9,965,113 B2 * 5/2018 Ryu ........................ G06F 3/044
2012/0249465 A1 * 10/2012 Lin .......................... G06F 3/041
345/173

(Continued)

*Primary Examiner* — Kwang-Su Yang
(74) *Attorney, Agent, or Firm* — Rosenberg, Klein & Lee

(57) ABSTRACT

A curved touch module structure and a method for laminating the same, which are the theremoplastic technologies, are used to solve the problem with wrinkles at stress-accumulated positions easily caused by a laminated material during a process of laminating a curved surface. The internal curved surface of an appearance-protecting layer has a planar structure whose position corresponds to the bonding area of a touch element layer. When the touch element layer is theremoplastically laminated to the curved surface of the appearance-protecting layer, the first bonding pads of the bonding area are formed on the planar structure. As a result, when a rear-end process for hot pressing and bonding is performed, a bonding platform needs to be designed according to the shape and curvature of products without modifying the other existing elements, thereby increasing the fabrication yield and reducing the production cost.

9 Claims, 6 Drawing Sheets

(51) Int. Cl.
*B32B 37/06* (2006.01)
*B32B 37/12* (2006.01)

(52) U.S. Cl.
CPC ............... *B32B 2457/208* (2013.01); *G06F 2203/04103* (2013.01)

(56) References Cited

U.S. PATENT DOCUMENTS

2017/0075444 A1* 3/2017 Nade .................. G06F 3/041
2018/0250912 A1* 9/2018 Chen .................. B32B 7/12

* cited by examiner

CURVED TOUCH MODULE STRUCTURE AND METHOD FOR LAMINATING THE SAME

This application claims priority for China patent application no. 201810331837.2 filed on Apr. 13, 2018, the content of which is incorporated by reference in its entirety.

BACKGROUND OF THE INVENTION

Field of the Invention

The present invention relates to a touch panel structure, particularly to a curved touch module structure and a method for laminating the same.

Description of the Related Art

With the development of the touch technology, a touch interface has progression from a planar shape to a multi-axis curvy shape. However, in the process of laminating a touch panel, the laminated material easily causes a laminated abnormality and wrinkles at stress-accumulated positions since a multi-axis appearance member has a two-axis curvature. As a result, touch traces will cause micro cracks due to pulls and deflections to increase the local resistances, such that an abnormal touch function appears.

In the process of hot pressing and bonding flexible printed circuits (FPCs), a new platform should be prepared according to the curvature and shape of products when using the existing way of bonding planar touch panels. Besides, different thermal heads need to be designed according to the curvature and shape of molds. However, after the electrode patterns of touch components are thermoplastically molded, the electrode patterns have variations of size in three dimensions X, Y, and Z. If the bonding thermal head is designed to have a curved surface, the variations of size in three dimensions may be caused again during the thermoplastically-molded process, thereby resulting in pitch shift for the laminated process and yield loss.

SUMMARY OF THE INVENTION

The primary objective of the present invention is to provide a curved touch module structure and a method for laminating the same, wherein the internal curved surface of an appearance-protecting layer has a planar structure corresponding to the bonding pads of a touch element layer. After a thermoplastically-laminated process, the shape of a thermal head for a hot-pressing and laminating process is not modified to effectively reduce variations for the fabrication process and the fabrication cost and increase the production yield.

To achieve the abovementioned objectives, the present invention provides a curved touch module structure, which comprises a touch element layer and an appearance-protecting layer. The touch element layer includes a display area and a bonding area. The display area has a plurality of conductive traces, and the bonding area has a plurality of first bonding pads electrically connected to the plurality of conductive traces. The appearance-protecting layer has an external curved surface and an internal curved surface separating from the external curved surface, and the internal curved surface includes a planar structure. The touch element layer is thermoplastically laminated to the internal curved surface, such that the first bonding pads are formed on the planar structure. Besides, an adhesive layer is formed between the touch element layer and the appearance-protecting layer due to a thermoplastic behavior or using an adhesive. An anisotropic conductive film is used to bond the touch element layer to a soft touch module, and the plurality of first bonding pads of the touch element layer are electrically connected to a plurality of second bonding pads that correspond to the soft touch module.

The present invention provides a method for laminating a curved touch module structure, which comprises: forming a touch element layer that comprises a display area and a bonding area, the display area has a plurality of conductive traces, and the bonding area has a plurality of first bonding pads electrically connected to the conductive traces; providing an appearance-protecting layer that has an external curved surface and an internal curved surface separating from the external curved surface, and the internal curved surface includes a planar structure; thermoplastically laminating the touch element layer to the internal curved surface of the appearance-protecting layer to arrange the plurality of first bonding pads on the planar structure; and using an anisotropic conductive film to bond the touch element layer to a soft touch module and electrically connecting the plurality of first bonding pads to a plurality of second bonding pads that correspond to the soft touch module.

In an embodiment of the present invention, an adhesive layer is formed between the touch element layer and the appearance-protecting layer due to a thermoplastic behavior or using an adhesive. Preferably, the adhesive layer may be a thermosensitive adhesive, and the appearance-protecting layer may be made of glass or a plastic composite material.

In an embodiment of the present invention, a thermal head hot presses the touch element layer, the appearance-protecting layer, the anisotropic conductive film, and the soft touch module on a hot-pressing jig in the step of laminating the touch element layer to the appearance-protecting layer.

By the curved touch module structure and the method for laminating the same of the present invention, the touch element layer is thermoplastically laminated to the appearance-protecting layer. Then, when the soft touch module is hot pressed and bonded to the touch element layer using the anisotropic conductive film, a platform for bonding is designed only according to the curvature and shape of products. The thermal head need not be modified to have a curved surface, lest the conductive traces of the touch element layer have three-dimensional variations. Thus, the pitch shift for the bonded process can be greatly decreased to increase the production yield and the competiveness and reduce the fabrication cost.

Below, the embodiments are described in detail in cooperation with the drawings to make easily understood the technical contents, characteristics and accomplishments of the present invention.

DETAILED DESCRIPTION OF THE INVENTION

Figure 1A:
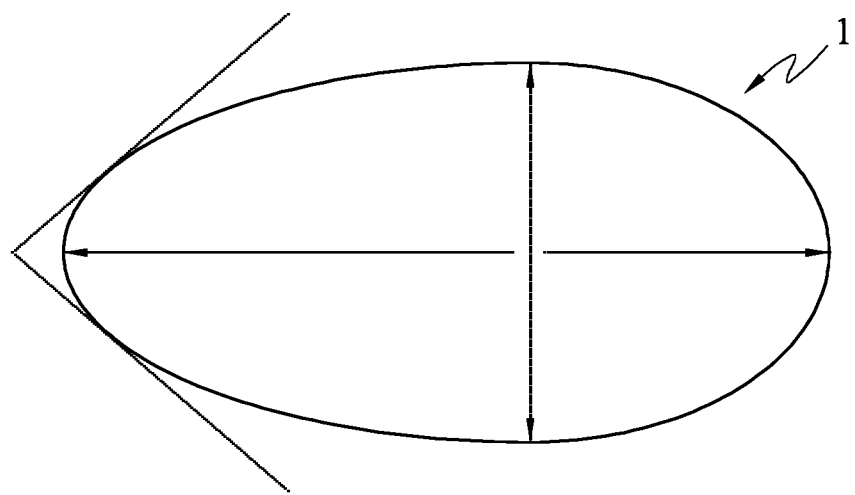
FIG. 1A and FIG. 1B are respectively a top view and a side view of a curved touch module structure according to an embodiment of the present invention.
Figure 1B:
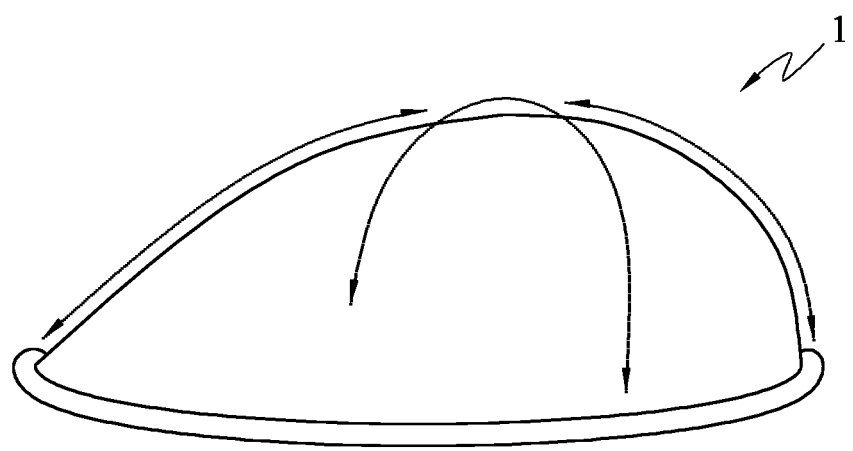

Refer to FIG. 1A and FIG. 1B, which are respectively a top view and a side view of a curved touch module structure 1 according to an embodiment of the present invention. In the embodiment, the appearance of the curved touch module structure 1 is multi-axis curvy. In an embodiment, the curved touch module structure 1 is applied to various electronic devices, such as a display device, a tablet computer, a smart phone, a laptop, a desktop computer, a television, a global positioning system, a vehicular display, an aircraft display, or a portable digital versatile disc (DVD) player.

Figure 2:
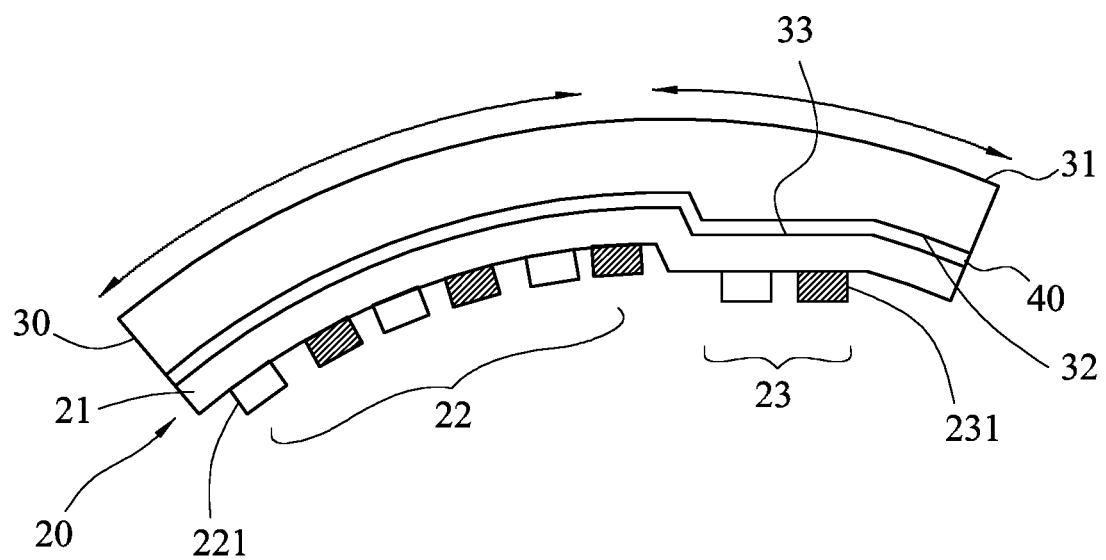
FIG. 2 is a cross-sectional view of a curved touch module structure according to an embodiment of the present invention.

Refer to FIG. 2, which is a cross-sectional view of a curved touch module structure according to an embodiment of the present invention. In the embodiment, the curved touch module structure comprises a touch element layer 20 and an appearance-protecting layer 30. The touch element layer 20 is a transparent conductive film for thermoplastically stretching and formed on a transparent substrate 21, such that electrode patterns are formed on the surface the substrate 21. The touch element layer 20 is divided into a display area 22 and a bonding area 23. The display area 22 has a plurality of conductive traces 221. The bonding area 23 has a plurality of first bonding pads 231 electrically connected to the plurality of conductive traces 221. In an embodiment, the transparent conductive film may be made of poly-3,4-ethylenedioxythiophene (PEDOT), silver nanowires (SNWs), or carbon nanotubes (CNTs). The transparent substrate 21 may be made of polyethylene terephthalate (PET) or polycarbonate (PC). The appearance-protecting layer 30 has an external curved surface 31 and an internal curved surface 32 separating from the external curved surface 31. The internal curved surface 32 includes a planar structure 33. The touch element layer 20 is thermoplastically laminated to the internal curved surface 32, such that the first bonding pads 231 are formed on the planar structure 33. In the embodiment, the appearance-protecting layer 30 may be made of tempered glass or a plastic composite material. An adhesive layer 40 is formed between the touch element layer 20 and the appearance-protecting layer 30 due to a thermoplastic behavior or using an adhesive. In the embodiment, the adhesive may be a thermosensitive adhesive.

Figure 3:
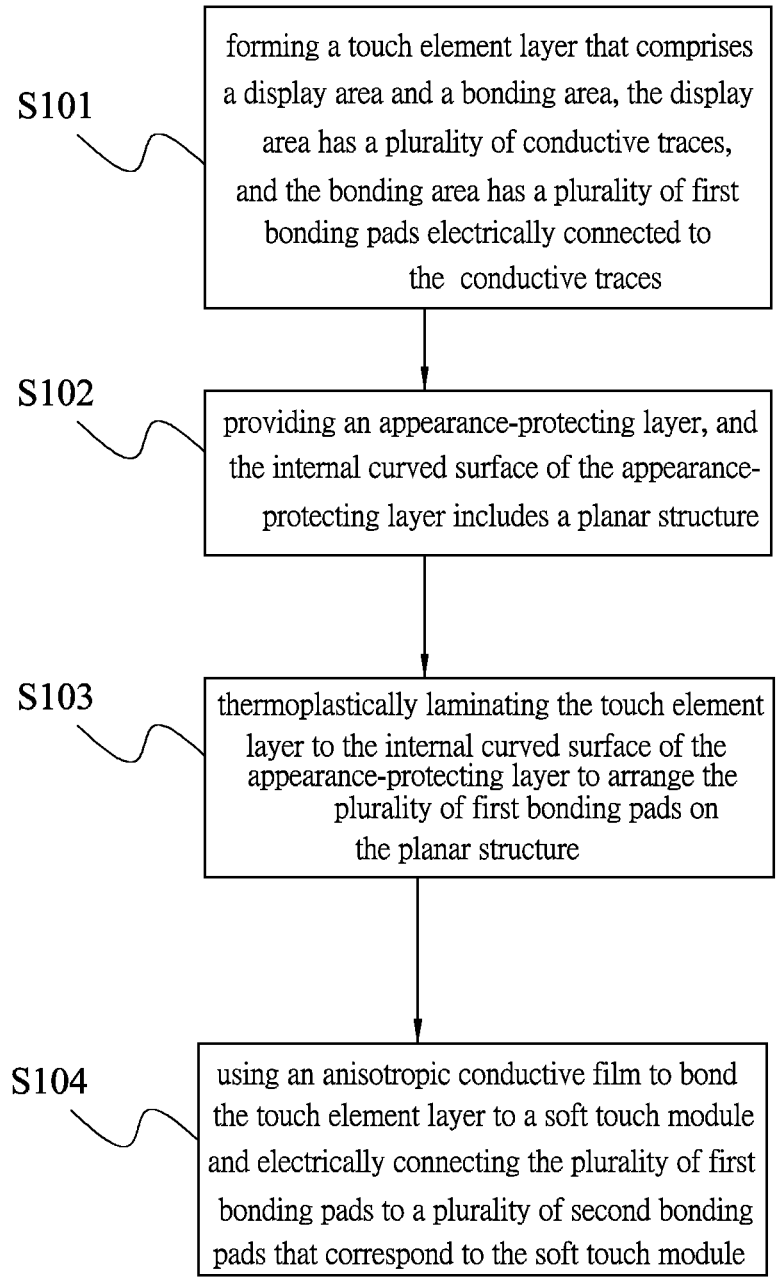
FIG. 3 is a flowchart of laminating a curved touch module structure according to an embodiment of the present invention.

Refer to FIG. 3, which is a flowchart of laminating a curved touch module structure according to an embodiment of the present invention. Refer to FIGS. 4A-4D, which are diagrams showing the steps of laminating a curved touch module structure according to an embodiment of the present invention. The method of laminating the curved touch module structure is described as follows.

Figure 4A:
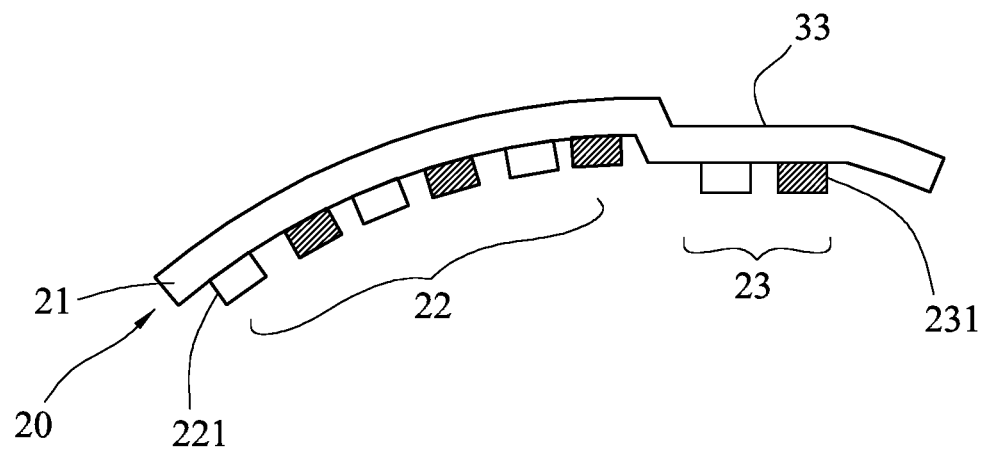
FIGS. 4A-4D are diagrams showing the steps of laminating a curved touch module structure according to an embodiment of the present invention.

In Step S101 and FIG. 4A, the touch element layer 20 that comprises a display area 22 and a bonding area 23 is formed, the display area 22 has a plurality of conductive traces 221, and the bonding area 23 has a plurality of first bonding pads 231 electrically connected to the conductive traces 221.

Figure 4B:
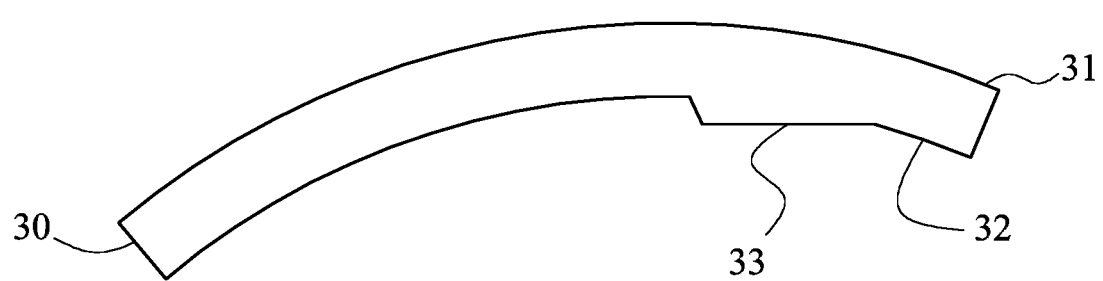

In Step S102 and FIG. 4B, the appearance-protecting layer 30 that has an external curved surface 31 and an internal curved surface 32 separating from the external curved surface 31 is provided, and the internal curved surface 32 includes a planar structure 33.

Figure 4C:
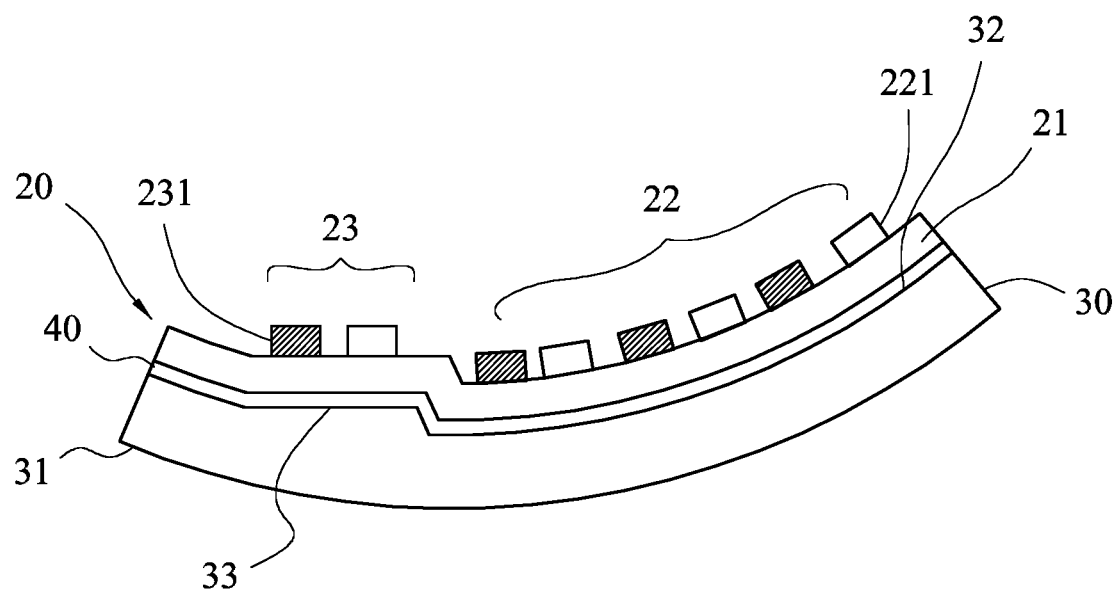

In Step S103 and FIG. 4C, the touch element layer 20 is laminated to the internal curved surface 32 of the appearance-protecting layer 30, such that the touch element layer 20 is tightly combined with the appearance-protecting layer 30 in a thermoplastic way. The plurality of first bonding pads 231 are formed on the planar structure 33. In this step, the adhesive layer 40 is formed between the touch element layer 20 and the appearance-protecting layer 30 due to a thermoplastic behavior or using an adhesive.

Figure 4D:
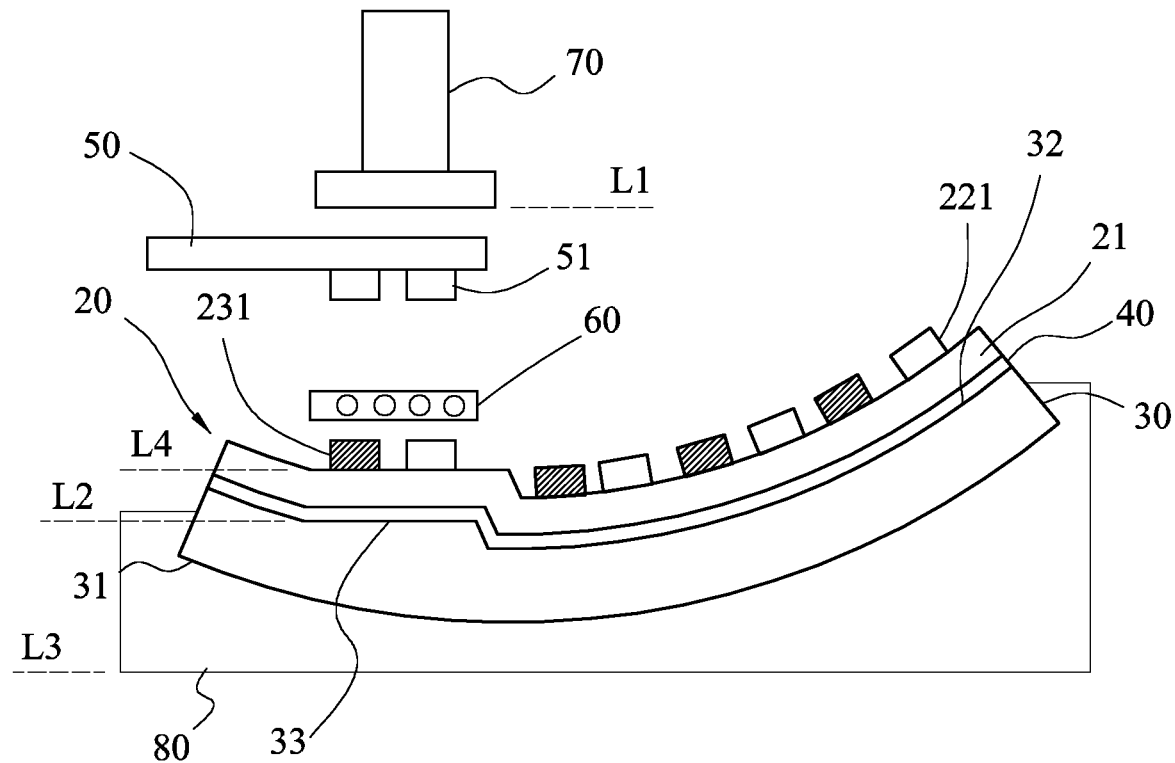

In Step S104 and FIG. 4D, an anisotropic conductive film 60 is used to bond the touch element layer 20 to a soft touch module 50 and the plurality of first bonding pads 231 of the touch element layer 20 are electrically connected to a plurality of second bonding pads 51 that correspond to the soft touch module 50. In this step, a thermal head 70 hot presses the touch element layer 20, the appearance-protecting layer 30, the anisotropic conductive film 60, and the soft touch module 50 on a hot-pressing jig 80.

In an embodiment, the surface L4 of the bonding area 23 may be parallel to the surface L2 of the planar structure 33. In an embodiment, the surface L4 of the bonding area 23 may be nonparallel to the surface L2 of the planar structure 33.

Figure 5:
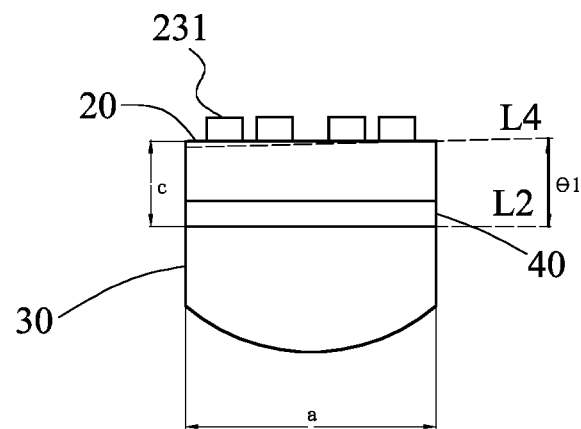
FIG. 5 is a diagram schematically showing a planar structure of FIG. 4C.

FIG. 5 is a diagram schematically showing the planar structure 33 of FIG. 4C. Refer to FIG. 5, FIG. 4C, and FIG. 4D. The included angle $\theta_1$ between the surface L2 of the planar structure 33 and the surface L4 of the bonding area 23 is defined by a relationship of $0<\tan\theta_1<c/a$, wherein a is an effective width of the bonding area 23, and c is a distance between the surface L2 of the planar structure 33 and the surface L4 of the bonding area 23.

Figure 6:
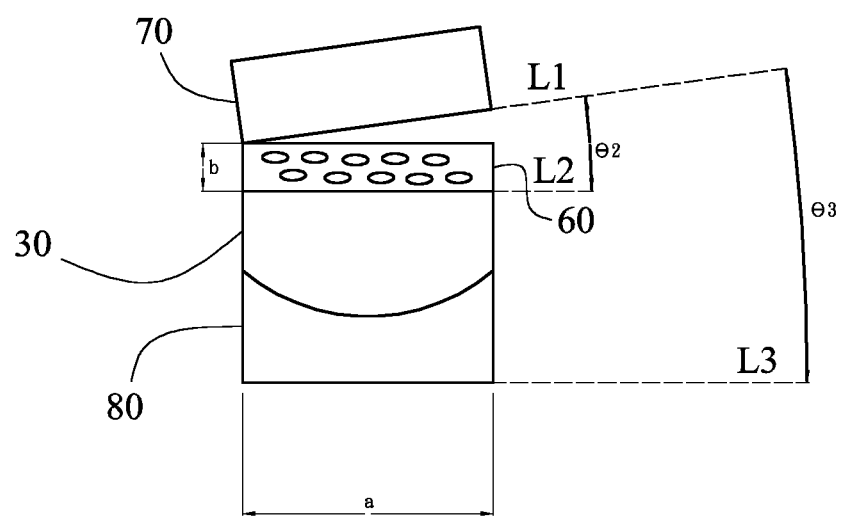
FIG. 6 is a diagram schematically showing a planar structure of FIG. 4D.

FIG. 6 is a diagram schematically showing the planar structure 33 of FIG. 4D. Refer to FIG. 4C, FIG. 4D, and FIG. 6. The included angle $\theta_2$ between the bottom surface L1 of the thermal head 70 that faces the soft touch module 50 and the surface L2 of the planar structure 33 is defined by a relationship of $0<\tan\theta_2<b/a$. The included angle $\theta_3$ between the bottom surface L1 of the thermal head 70 that faces the soft touch module 50 and the bottom surface L3 of the hot-pressing jig 80 is defined by a relationship of $0<\tan\theta_3<b/a$, wherein a is an effective width of the bonding area 23, and b is a thickness of the anisotropic conductive film 60.

As shown in FIG. 5 and FIG. 6, the included angles $\theta_1$, $\theta_2$, and $\theta_3$ are used to schematically show the relative positions of the components. Thus, the included angles $\theta_1$, $\theta_2$, and $\theta_3$ are not actual angles. In conclusion, the curved touch module structure and the method for laminating the same designs the internal curved surface of the appearance-protecting layer to have a planar structure whose position corresponds to the bonding area of the touch element layer. The bonding area of the touch element layer is directly theremoplastically laminated to the planar structure. As a result, when a rear-end process for hot pressing and bonding is performed, a bonding platform needs to be designed according to the shape and curvature of products without modifying the shape of the other existing hot-pressing elements (such as modifying the thermal head to have a curved surface), lest the conductive traces of the touch element layer have three-dimensional variations. Thus, the pitch shift for the bonded process can be decreased.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A curved touch module structure comprising:
a touch element layer including a display area and a bonding area, wherein the display area has a plurality of conductive traces, and the bonding area has a plurality of first bonding pads electrically connected to the plurality of conductive traces;
an appearance-protecting layer having an external curved surface and an internal curved surface separating from the external curved surface, wherein the internal curved surface includes a planar structure, the touch element layer is thermoplastically laminated to the internal curved surface to arrange the plurality of first bonding pads on the planar structure, a curvature of the external curved surface is continuously changed, and a structural gap is formed between the planar structure and the internal curved surface that corresponds to the display area; and
an adhesive layer arranged between the touch element layer and the appearance-protecting layer.

2. The curved touch module structure according to claim 1, further comprising a soft touch module that faces the touch element layer, and a surface of the soft touch module corresponding to the plurality of first bonding pads is provided with a plurality of second bonding pads thereon.

3. The curved touch module structure according to claim 2, further comprising an anisotropic conductive film arranged between the plurality of first bonding pads and the plurality of second bonding pads.

4. The curved touch module structure according to claim 1, wherein a surface of the bonding area is parallel to the planar structure.

5. The curved touch module structure according to claim 1, wherein a surface of the bonding area is nonparallel to the planar structure.

6. A method for laminating a curved touch module structure comprising:
forming a touch element layer that comprises a display area and a bonding area, wherein the display area has a plurality of conductive traces, and the bonding area has a plurality of first bonding pads electrically connected to the conductive traces;
providing an appearance-protecting layer that has an external curved surface and an internal curved surface separating from the external curved surface, wherein the internal curved surface includes a planar structure, and a curvature of the external curved surface is continuously changed; and
thermoplastically laminating the touch element layer to the internal curved surface of the appearance-protecting layer to arrange the plurality of first bonding pads on the planar structure, wherein a structural gap is formed between the planar structure and the internal curved surface that corresponds to the display area.

7. The method for laminating the curved touch module structure according to claim 6, wherein in the step of laminating the touch element layer to the appearance-protecting layer, an adhesive layer is formed between the touch element layer and the appearance-protecting layer due to a thermoplastic behavior or using an adhesive.

8. The method for laminating the curved touch module structure according to claim 6, further comprising a step of using an anisotropic conductive film to bond the touch element layer to a soft touch module and electrically connecting the plurality of first bonding pads to a plurality of second bonding pads that correspond to the soft touch module.

9. The method for laminating the curved touch module structure according to claim 8, wherein in the step of bonding the touch element layer to the soft touch module, a thermal head hot presses the touch element layer, the appearance-protecting layer, the anisotropic conductive film, and the soft touch module on a hot-pressing jig.

* * * * *